March 23, 1954

G. PASCOE ET AL 2,673,168

GLASS ROLLING APPARATUS

Filed Aug. 7, 1951

G. PASCOE
O. E. RUGG
INVENTOR.

BY E. C. McRae
J. R. Faulkner
D. H. Oster

ATTORNEYS

Patented Mar. 23, 1954

2,673,168

UNITED STATES PATENT OFFICE 2,673,168

GLASS ROLLING APPARATUS

George Pascoe and Ormund E. Rugg, Detroit, Mich., assignors to Ford Motor Company, Dearborn, Mich., a corporation of Delaware Application August 7, 1951, Serial No. 240,638

9 Claims. (Cl. 154—2.7)

This invention is concerned with a process and apparatus for the production of laminated safety glass and more specifically with the production of curved laminated safety glass.

In the conventional production of laminated safety glass, a lamina of a vinyl type plastic is inserted between two sheets of ordinary window or plate glass to prevent the generation of lethal edges and fragments of glass in the event of an accident to the motor vehicle in which such glass has been incorporated. This raw sandwich is conventionally warmed slightly and then subjected to pressure by rolling or otherwise to eliminate air from the structure. This deaerated sandwich is then heated to 150–170° F. to render the vinyl plastic tacky and again subjected to pressure, usually by rolling to cause the glass layers to adhere to the plastic. This glass is said to be prepressed and is now ready for immersion in the heated oil of the autoclave to complete the operation and render the sandwich transparent.

The above outlined steps are comparatively simple when the glass is perfectly flat. However in recent years the demand has arisen for curved, laminated glass, particularly for windshield construction. The processes and equipment usable for deaerating and prepressing flat glass are utterly useless insofar as curved glass is concerned. The instant invention has been developed to provide a method and apparatus for quickly and economically deaerating and prepressing large numbers of curved laminated sandwiches. This invention is probably best understood by reference to the drawings in which Figure 1 is an elevation partially in section of a prepressing and deaerating device.

Figure 1:
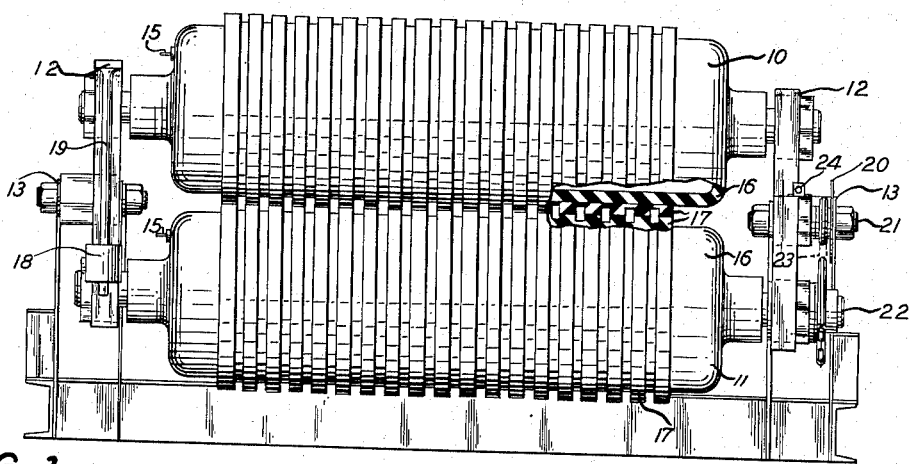

The preferred machine for deaerating and prepressing curved glass sandwiches comprises upper roll 10 and lower roll 11 journalled for rotation in side members 12. Side members 12 are in turn journalled for rotation in trunnions 13 which are mounted on cross members 14. Trunnions 13 are located intermediate the axes of upper roll 10 and lower roll 11. Both upper roll 10 and lower roll 11 are hollow inflatable rubber structures fabricated from an elastomer material treated to exhibit a harness corresponding to a Durometer reading of 40–45. Each of these rolls is provided with a valve 15 to provide for the inflation and deflation of the rolls pneumatically. This valve 15 is preferably a standard tire valve.

Both upper roll 10 and lower roll 11 are composed of a pneumatic casing 16 to which has been exteriorly vulcanized a tread 17. Tread 17 has been fabricated to yield a series of rectangular, circumferential grooves around the exterior of casing 16 as is clearly shown in Figure 1 of the drawings.

Figures 2, 3:
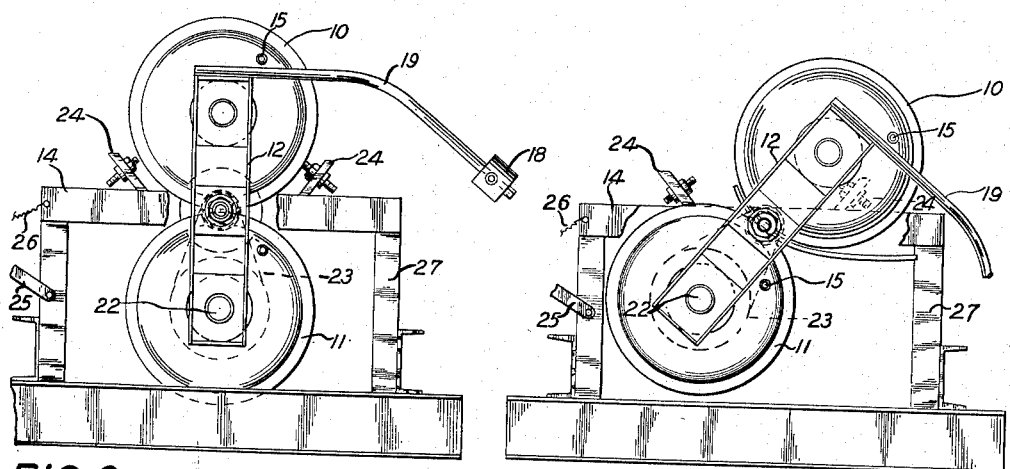
Figure 2 is an end view of the prepressing and deaerating device in a neutral position.
Figure 3 is an end view of the prepressing and deaerating device in the position assumed shortly after the entry of the glass sandwich into the machine.
Figure 4:
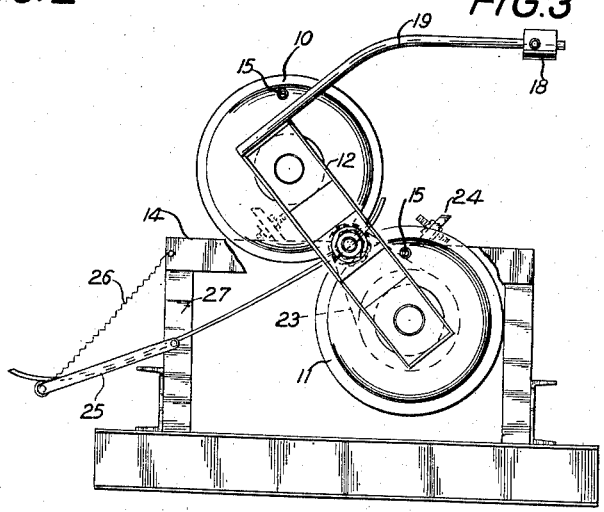
Figure 4 is an end view of the prepressing and deaerating device in the position assumed just prior to the time the glass sandwich clears the machine.

Referring to Figure 2 and Figure 4, it will be seen that the assemblage of upper roll 10, lower roll 11 and side members 12 is biased to rotate in trunnions 13 in a clockwise direction by counterweight 18 suspended on rod 19. The inner end of rod 19 is welded to one of side members 12.

Sprocket 20 is mounted upon stub shaft 21. Sprocket 20 and stub shaft 21 are arranged to be chain driven from any convenient source of motion (not shown). Lower roll 11 terminates in shaft 22. Shaft 22 is driven by stub shaft 21 by chain 23. As seen in Figures 2, 3 and 4, the rotation of lower roll 11 is counterclockwise. Upper roll 10 is driven frictionally by contact with lower roll 11 and of course rotates clockwise as shown in Figures 1, 2, 3 and 4. Adjustable stops 24 are provided to limit the rotation of the assembly on trunnions 13 within definite limits. As shown in Figure 4, arms 25 are pivotally supported on frame 27 and biased upward by spring 26. The purpose of this structure will appear as the description proceeds.

In use, counterweight 18 is sufficient to cause the assemblage to rotate clockwise to the extreme position shown in Figure 3, regardless of the torque exerted by the mechanical drive. The assembled curved glass-plastic sandwiches are brought to the machine upon a conveyor (not shown) with the elements of the curve of the glass approximately parallel to the line of contact of rolls 10 and 11. The curvature of an ordinary automobile windshield is such that with the assemblage tilted to the extreme position as shown in Figure 3, the leading edge of the glass sandwich will just enter the nip of rolls 10 and 11.

As the curved sandwich is seized by the rolls, it will be carried through the rolls and subjected to pressure to expel the air from between the laminae making up the sandwich. The pressure exerted on the glass during the deaerating process is sufficient to locally "tack" or secure the plastic to the glass. This tacking is essential to prevent shrinkage and wrinkling of the plastic during the subsequent prepressing process. When the sandwich starts through the rolls, its weight is transferred from the conveying mechanism to the rolls. In the early stages of the rolling indicated in Figure 3, the weight of the glass sandwich will tend to rotate the assemblage strongly in a clockwise direction. As the rolling proceeds, the clockwise torque due to the unbalanced weight of the sandwich will gradually decay to zero and then become a gradually increasing counterclockwise torque. Eventually this counterclockwise torque will overcome the friction in the machine and the effect of counterweight 18 and the assemblage will start to rotate counterclockwise into the position shown in Figure 4. As this counterclockwise rotation proceeds, the rolled end of the sandwich will descend until it is caught upon a rubber roll supported between the ends of arms 25. The springs 26 supporting arms 25 will decelerate the rotary motion and avoid undue strain upon the glass. As soon as the trailing edge of the glass sandwich has cleared the rolls, a conveying mechanism (not shown) receives the rolled sandwich and conveys it to the next operation which is usually a heating step preparatory to prepressing.

It is to be understood that the exact pressure to which upper roll 10 and lower roll 11 are to be inflated must be determined experimentally for each individual operation as this optimum pressure is influenced by many factors such as roll size, roll speed, glass overhang and roll spacing. It has been found to be impossible to correlate these factors to predict the proper roll inflation pressure. In some circumstances it has been found to be advantageous to have the pressure in the upper roll decidedly higher than the lower roll. For example the upper roll has been inflated to a pressure of 25 pounds per square inch and the lower roll to 20 pounds per square inch. Under other circumstances a uniform pressure of pounds per square inch in each roll has been successfully employed.

In using the described apparatus it is found that windshield sandwiches may be deaerated cold and the usual heating step prior to deaeration avoided. It is to be understood that this apparatus may be employed with equal facility whether the glass to be deaerated is hot or at a temperature of only 80 to 90° F. This same apparatus may also be employed to execute the prepressing operation. This operation is of course conducted with the sandwich heated to about 150° F. to render the plastic layer tacky.

We claim as our invention:

1. A laminated glass deaerating and tacking machine comprising a pair of opposed cross members, each of said cross members pivotally supporting a side member at a location intermediate the ends of the side member, a pair of journals supported on each side member on either side of the point at which the side member is supported on the cross member and equidistant from such point of support and a pair of inflatable elastomer rollers supported in said journals, the diameter of the rolls being slightly greater than the distance between the journals as measured along one of the side members whereby a wringer-like structure is achieved and means for driving at least one of the rolls, the surface of said rolls being provided with a plurality of rectangular circumferential grooves.

2. A laminated glass deaerating and tacking machine comprising a pair of opposed cross members, each of said cross members pivotally supporting a side member at a location intermediate the ends of the side member, a pair of journals supported on each side member on either side of the point at which the side member is supported on the cross member and equidistant from such point of support and a pair of inflatable elastomer rollers supported in said journals, the diameter of the rolls being slightly greater than the distance between the journals as measured along one of the side members whereby a wringer-like structure is achieved, and means for driving at least one of the rolls, said side members being provided with an overhanging counterweight to bias the entire assembly to rotate in one direction.

3. A laminated glass deaerating and tacking machine comprising a pair of opposed cross members, each of said cross members pivotally supporting a side member at a location intermediate the ends of the side member, a pair of journals supported on each side member on either side of the point at which the side member is supported on the cross member and equidistant from such point of support and a pair of inflatable elastomer rollers supported in said journals, the diameter of the rolls being slightly greater than the distance between the journals as measured along one of the side members whereby a wringer-like structure is achieved, and means for driving at least one of the rolls, said frame being provided with a spring cushioned roll to receive the glass emerging from the rolls.

4. A laminated glass deaerating and tacking machine comprising a pair of opposed cross members, each of said cross members pivotally supporting a side member at a location intermediate the ends of the side member, a pair of journals supported on each side member on either side of the point at which the side member is supported on the cross member and equidistant from such point of support and a pair of inflatable elastomer rollers supported in said journals, the diameter of the rolls being slightly greater than the distance between the journals as measured along one of the side members whereby a wringer-like structure is achieved, and means for driving at least one of the rolls, both of said rollers being inflated, with the upper roll inflated to a substantially higher pressure than the lower roller.

5. A laminated glass deaerating and tacking machine comprising a pair of opposed cross members, each of said cross members pivotally supporting a side member at a location intermediate the ends of the side member, a pair of journals supported on each side member on either side of the point at which the side member is supported on the cross member and equidistant from such point of support and a pair of inflatable elastomer rollers supported in said journals, the diameter of the rolls being slightly greater than the distance between the journals as measured along one of the side members whereby a wringer-like structure is achieved, and means for driving at least one of the rolls, the upper of said rollers being inflated to a pressure of about 25 pounds per square inch and the lower of said rollers being inflated to a pressure of about twenty pounds per square inch.

6. A laminated glass deaerating and tacking machine comprising a pair of opposed cross members, each of said cross members pivotally supporting a side member at a location intermediate the ends of the side member, a pair of journals supported on each side member on either side of the point at which the side member is supported on the cross member and equidistant from such point of support and a pair of inflatable elastomer rollers supported in said journals, the diameter of the rolls being slightly greater than the distance between the journals as measured along one of the side members whereby a wringer like structure is achieved and means for driving at least one of the rolls, the surface of said rolls being provided with a plurality of rectangular circumferential grooves, said side members being provided with an overhanging counterweight to bias the entire assembly in one direction, and said frame being provided with a spring cushioned roll to receive the glass emerging from the rolls.

7. A laminated glass deaerating and tacking machine comprising a pair of opposed cross members, each of said cross members pivotally supporting a side member at a location intermediate the ends of the side member, a pair of journals supported on each side member on either side of the point at which the side member is supported on the cross member and equidistant from such point of support and a pair of elastomer rollers supported in said journals, the diameter of the rolls being slightly greater than the distance between the journals as measured along one of the side members whereby a wringer like structure is achieved and means for driving at least one of the rolls, the surface of said rolls being provided with a plurality of rectangular circumferential grooves.

8. A laminated glass deaerating and tacking machine comprising a pair of opposed cross members, each of said cross members pivotally supporting a side member at a location intermediate the ends of the side member, a pair of journals supported on each side member on either side of the point at which the side member is supported on the cross member and equidistant from such point of support and a pair of elastomer rollers supported in said journals, the diameter of the rolls being slightly greater than the distance between the journals as measured along one of the side members whereby a wringer like structure is achieved, and means for driving at least one of the rolls, said side members being provided with an overhanging counterweight to bias the entire assembly to rotate in one direction.

9. A laminated glass deaerating and tacking machine comprising a pair of opposed cross members, each of said cross members pivotally supporting a side member at a location intermediate the ends of the side member, a pair of journals supported on each side member on either side of the point at which the side member is supported on the cross member and equidistant from such point of support and a pair of elastomer rollers supported in said journals, the diameter of the rolls being slightly greater than the distance between the journals as measured along one of the side members whereby a wringer like structure is achieved and means for driving at least one of the rolls, the surface of said rolls being provided with a plurality of rectangular circumferential grooves, said side members being provided with an overhanging counterweight to bias the entire assembly in one direction, and said frame being provided with a spring cushioned roll to receive the glass emerging from the rolls.

GEORGE PASCOE.
ORMUND E. RUGG.

References Cited in the file of this patent

UNITED STATES PATENTS

| Number | Name | Date |
|---|---|---|
| 1,437,843 | Heinrichs | Dec. 5, 1922 |
| 2,075,726 | Kamerer | Mar. 30, 1937 |
| 2,514,320 | Fekete | July 4, 1950 |

FOREIGN PATENTS

| Number | Country | Date |
|---|---|---|
| 6,472 | Great Britain | of 1889 |
| 108,813 | Australia | Oct. 13, 1939 |